(12) United States Patent
Chang et al.

(10) Patent No.: US 6,425,775 B1
(45) Date of Patent: Jul. 30, 2002

(54) SMART CARD CONNECTOR

(75) Inventors: Jen Jou Chang, Yung-Ho; Hugh Chi Hsu, Tu-Chen, both of (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/811,127

(22) Filed: Mar. 16, 2001

(51) Int. Cl.[7] .............................................. H01R 13/703
(52) U.S. Cl. ...................................... 439/188; 439/630
(58) Field of Search ................................ 439/188, 489, 439/630–637, 260; 200/51.06

(56) References Cited

U.S. PATENT DOCUMENTS

| 4,900,273 A | * | 2/1990 | Pernet | 439/630 |
| 5,013,255 A | * | 5/1991 | Juret et al. | 439/188 |
| 5,334,034 A | * | 8/1994 | Reichart et al. | 439/188 |
| 6,126,464 A | * | 10/2000 | Chang | 439/188 |
| 6,132,229 A | * | 10/2000 | Wu | 439/188 |

* cited by examiner

*Primary Examiner*—Hien Vu
(74) *Attorney, Agent, or Firm*—Wei Te Chung

(57) ABSTRACT

A smart card connector for receiving a smart card comprises a spring switch to detect full insertion of the smart card. The spring switch includes a first spring contact and a second spring contact. The first spring contact comprises a body portion, a resilient contact portion and a fixing portion. The second spring contact comprises a body plate and a fixing portion. When a smart card is inserted the connector, the resilient contact portion of the first spring contact is deflected rearward to contact the second spring contact. Thus, force exerted on the contact portion of the first spring contact is transmitted to the fixing portion of the first spring contact with small deformation.

4 Claims, 6 Drawing Sheets

SMART CARD CONNECTOR

BACKGROUND OF THE INVENTION

The present invention relates to an electrical connector having a special spring switch to detect full insertion of a smart card, and particularly to a smart card connector with small deformation after assembly.

Generally, a smart card or chip card as presently used contains recording media in the card itself. This recording media or intelligence is typically in the form of a memory circuit which can contain read only memory or read/write memory (random access memory) contained on the card. The information stored in the card's memory can then be used by the card reader or card interface device to detect certain information stored on the card.

Referring to FIG. 7, U.S. Pat. No. 5,667,397 discloses a conventional card connector which comprises a spring switch 14 and a stationary post 16. Normally the spring switch 14 is in a closed position, and an extension portion 80 of the spring switch 14 resiliently contacts the stationary post 16. When a smart card (not shown) is fully inserted into the connector the spring switch 14 is pushed away from the closed position to an open position.

However, too much deformation will be exerted on the spring switch and after repeated insertions the mating state between the smart card and the connector will be deteriorated.

BRIEF SUMMARY OF THE INVENTION

A main object of the present invention is to provide a smart card connector having a special spring switch to detect full insertion of a smart card with small deformation.

To fulfill the above-mentioned object, according to a preferred embodiment of present invention, the smart card connector comprises a spring switch which is activated by the smart card upon full insertion into the card slot. The spring switch is normally in an open position. The spring switch includes a first spring contact and a second spring contact. The first spring contact is secured in front of the second contact. The first spring contact comprises a body portion, a resilient contact portion slantways extending from an end of the body portion and a fixing portion extending from an opposite end thereof. A folded portion is extending from the fixing portion for soldering the first spring contact to a printed circuit board. A contact arm extends from the resilient contact portion for contacting the second spring contact. The second spring contact comprises a body plate and a fixing portion formed at an end of the body plate. A folded portion extends from the fixing portion for securing the second spring contact onto the printed circuit board. When a smart card is inserted into the connector, the resilient contact portion of the first spring contact is deflected rearward and the contact arm then moves to contact the body plate of the second spring contact. Thus, electrical signal can commence to be transmitted between the smart card and the printed circuit board, and deformation exerted by the spring switch can also be reduced.

Other objects, advantages and novel features of the invention will become more apparent from the following detailed description when taken in conjunction with the accompanying drawings.

DETAILED DESCRIPTION OF THE INVENTION

Figure 1:
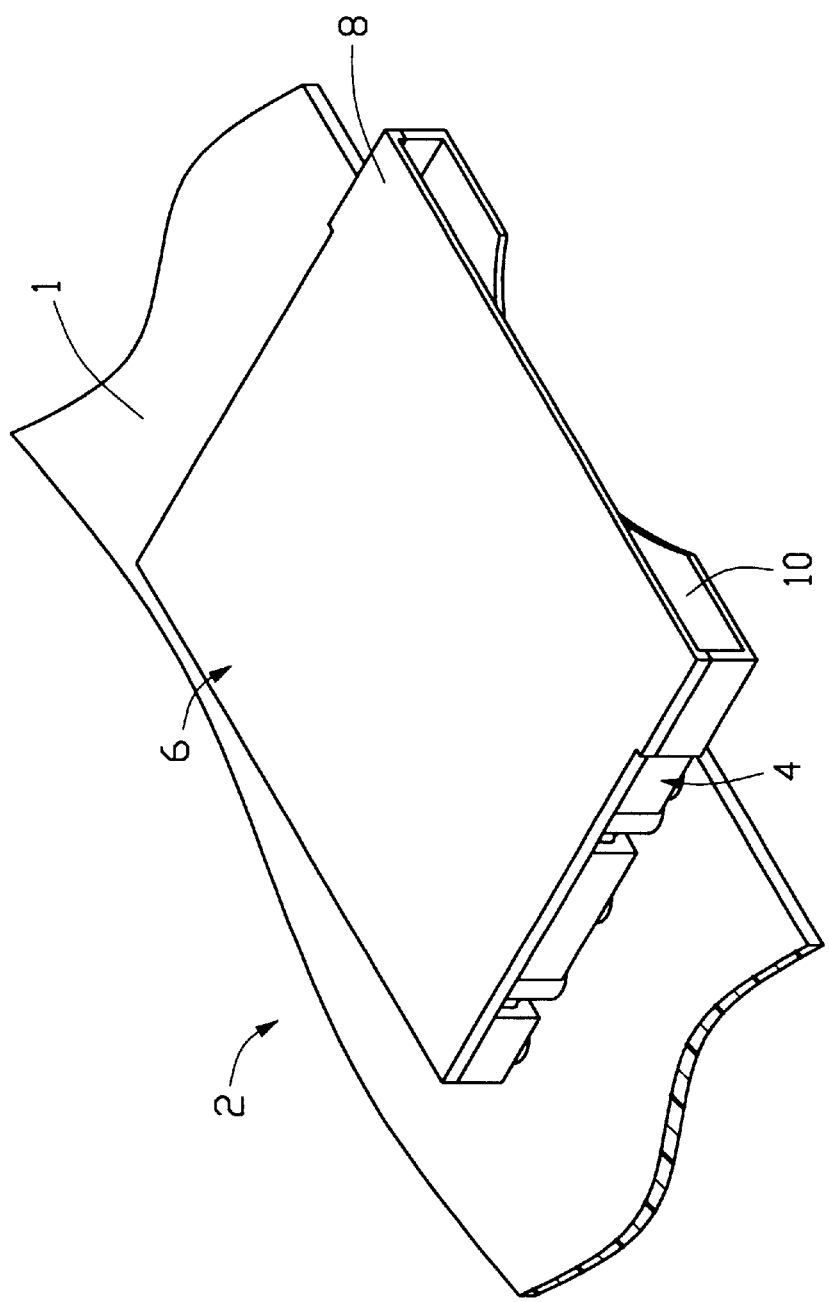
FIG. 1 is a perspective view of a smart card connector assembled on a circuit board in accordance with the present invention.

Referring to FIG. 1, a smart card connector 2 is mounted to a printed circuit board 1 and provides the interface in which a smart card can be inserted so that data can be read from or written into the smart card by the smart interface circuitry in a known way. The embodiment shown in FIG. 1 includes a housing base 4 and a housing cover, both of which have a scoop or card entry shroud 8 at the front of the housing. The base 4 and cover 6 together define a card slot 10 which extends from the front of the housing through the shroud or scoop 8 to the rear of the smart card connector 2.

Figure 2:
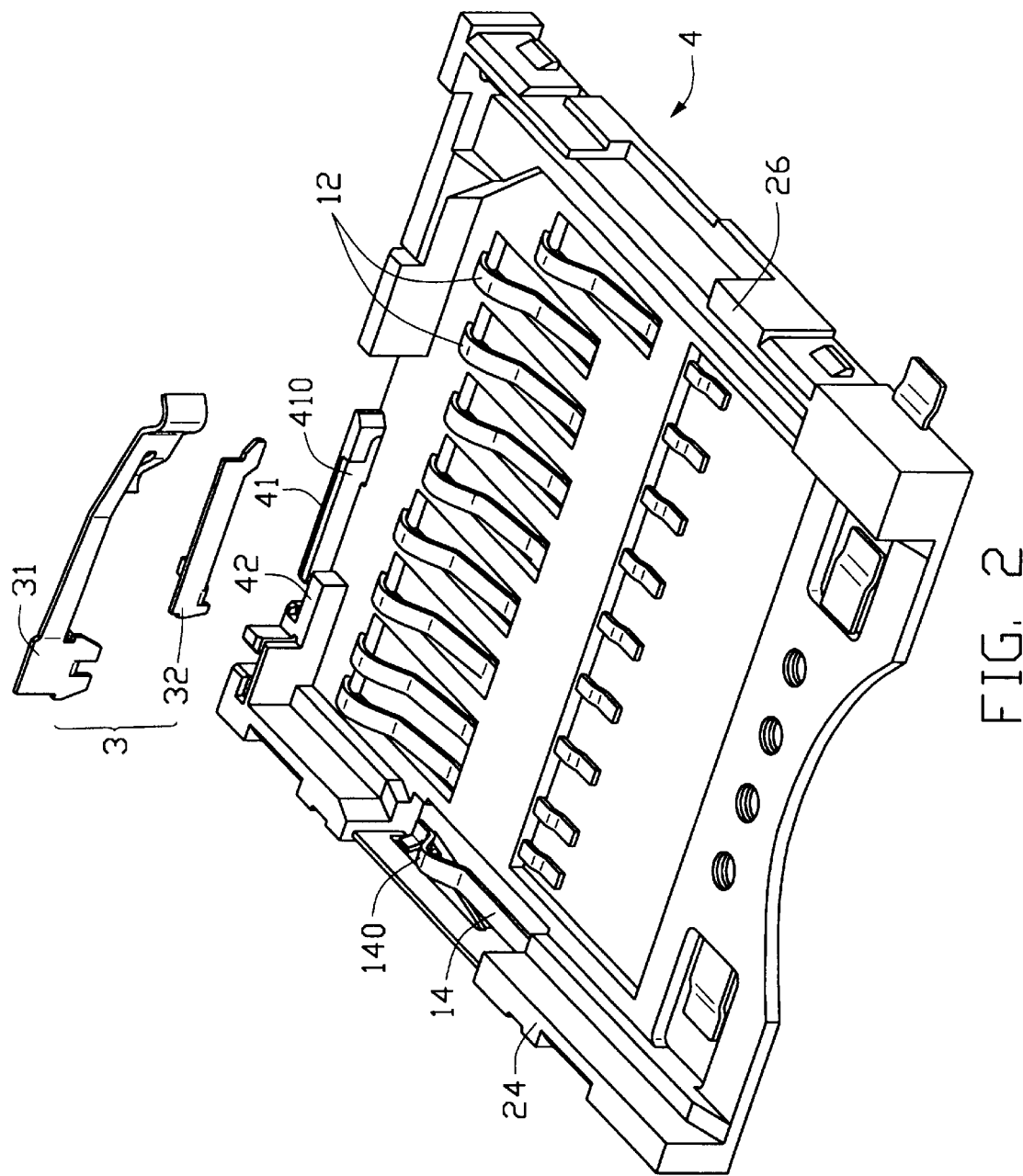
FIG. 2 is a perspective view of a spring switch and a housing base of the smart card connector.
Figure 3:
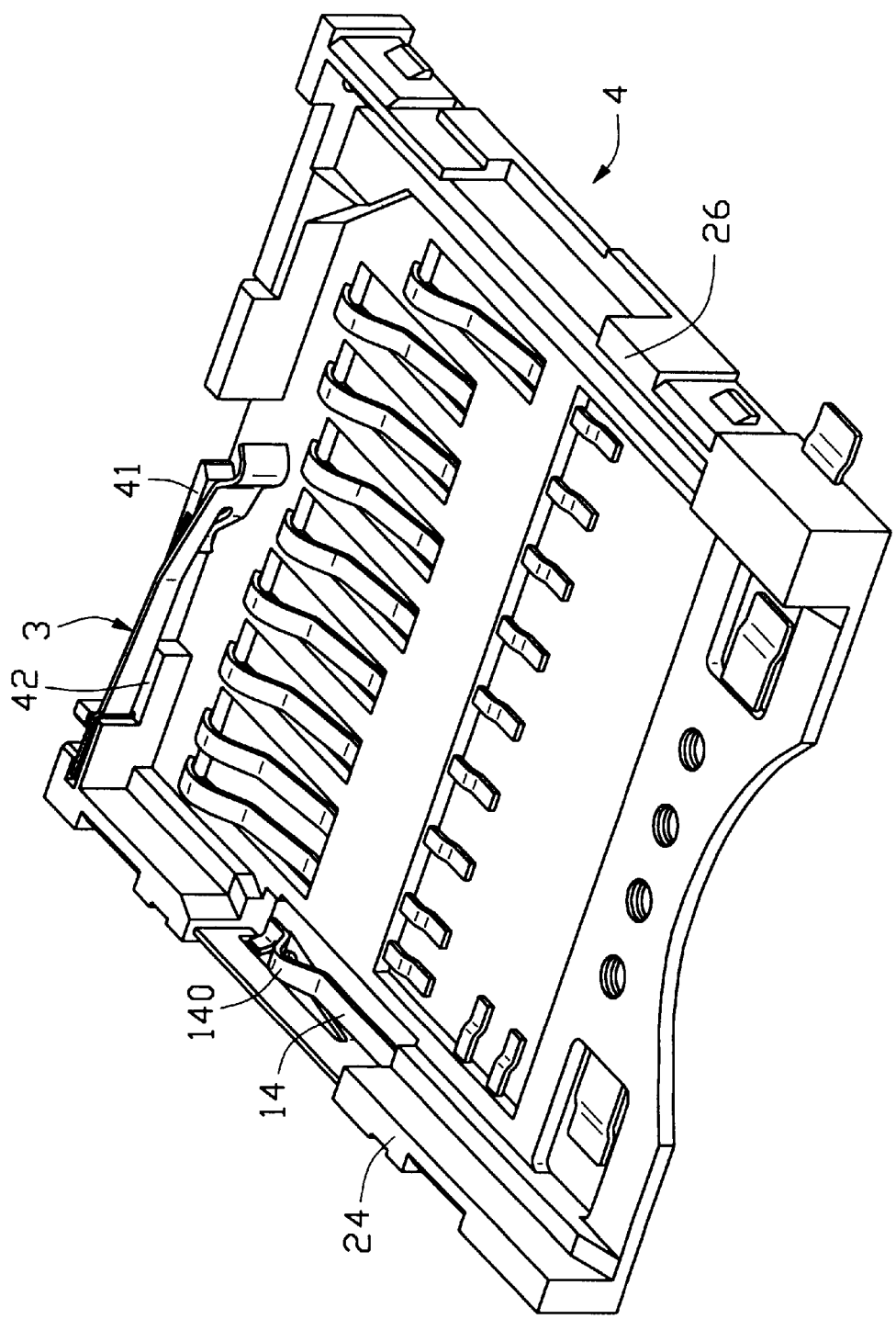
FIG. 3 is a perspective view of the spring switch assembled to the housing base of the smart card connector.

The housing base 4 is also shown in FIGS. 2 and 3. The upper surface of the housing base 4 comprises the bottom of the card slot 10. A plurality of data contacts 12 are mounted in the housing base 4 in such a position as to engage contact pads on the smart card. The data contacts 12 are resilient and contact portion of data contacts 12 extend above the upper surface of the housing base 4 where they will engage pads on the smart card. The housing base 4 has a peripheral rim 24,26 which extends around the two sides and partially along the rear of the upper surface of the housing base 4. A relief contact 14 anchored on left rim 24 of the housing base 4. Contact portion 140 of the relief contact 14 normally extends above the upper surface of the housing base 4 in the card slot area 10. When the smart card is inserted into the card slot 10, the card engages the contact portion 140 and the rlief contact 14 is forced downward while the card is urged upward toward the top of the slot 10. Thus, by urging the card upward, a stable force is exerted against the resilient data contacts 12, especially during relative movement berween the card and the data contacts 12. Therefore, the life of the data contacts 12 can be prolonged. A stop portion 41 is formed at rear portion of the housing base 4. A space is formed between the stop portion 41 and a rear rim portion 42 for receiving the spring switch 3. The spring switch 3 includes a first spring contact 31 and a second spring contact 32. The stop portion 41 comprises a recess 410 shaped for adapting to position the second spring contact 32. the first spring contact 31 and the second spring contact 32 are positioned between the stop portion 41 and the rear rim 42. The first spring contact 31 is secured in front of the second contact 32.

Figure 4:
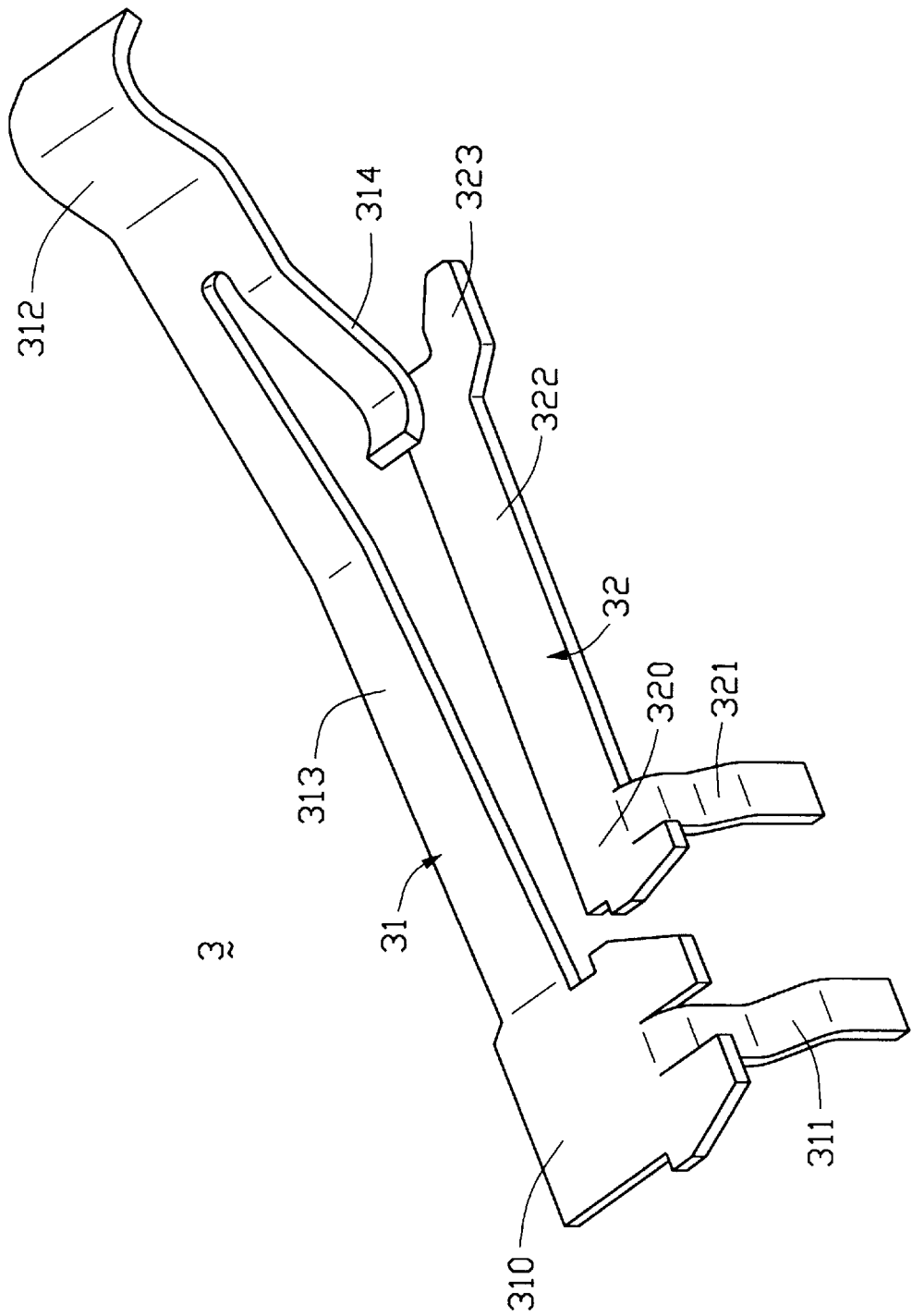
FIG. 4 is a perspective view of the spring switch in accordance with the present invention.
Figure 5:
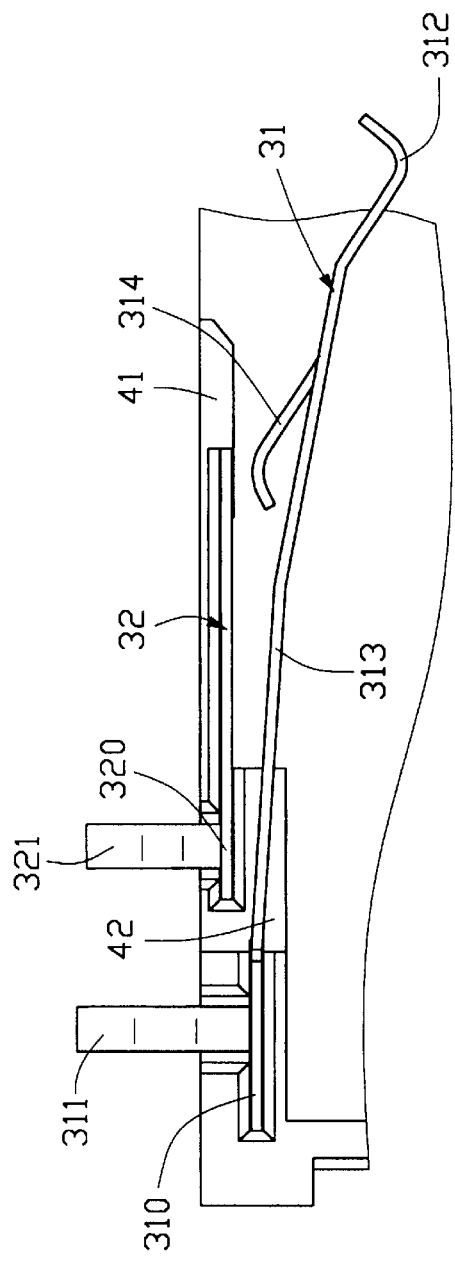
FIG. 5 is a top view of the spring switch assembled on the card connector before a card is inserted into the smart card connector.
Figure 6:
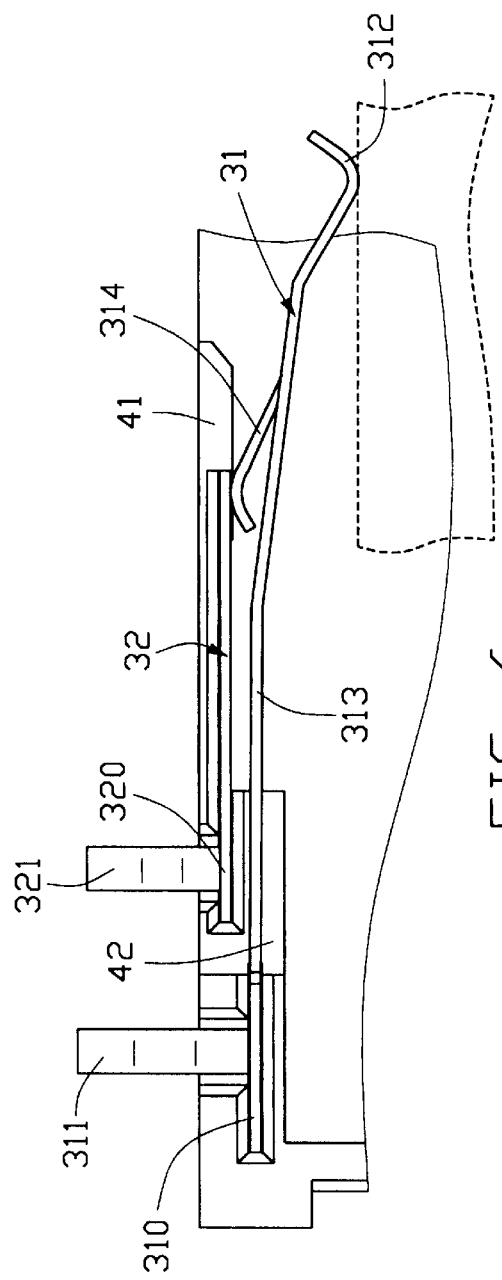
FIG. 6 is a top view of the spring switch assembled on the card connector after the card is inserted into the smart card connector.
Figure 7:
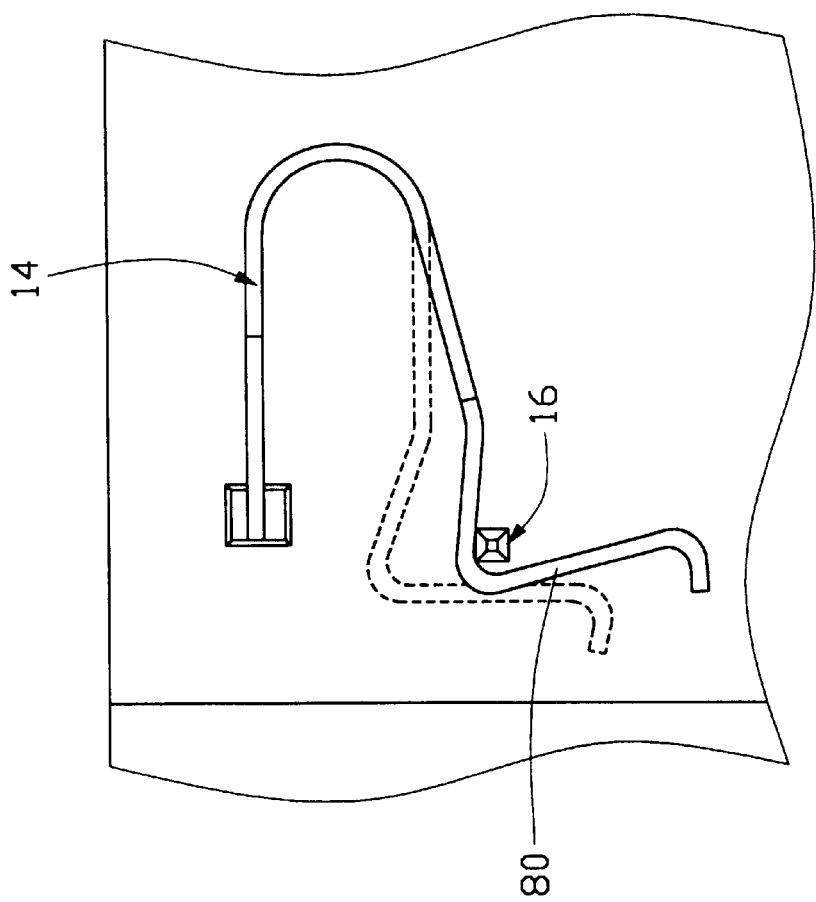
FIG. 7 is a perspective view of a conventional spring switch assembled on the card connector.

Referring to FIGS. 4–6, the first spring contact 31 comprises a body portion 313, a resilient contact portion 312 slantways extending from an end of the body portion 313 and a fixing portion 310 extending from an opposite end thereof. A folded portion 311 is extending from the fixing portion 310 for soldering the first spring contact 31 to the printed circuit board 1. A contact arm 314 extends from the resilient contact portion 312 for contacting the second spring contact 32. The second spring contact 32 comprises a flat body plate 322. The flat body plate 322 forms a fixing portion 320 at an end thereof. A folded portion 321 extends from the fixing portion 320 for securing the second spring contact 32 onto the printed circuit board 1. A projection portion 323 is formed opposite the fixing portion 321 for being snugly received in corresponding recess portion 410. When the smart card is inserted into the connector 2, the resilient contact portion 312 of the first spring contact 31 is deflected rearward and the contact arm 314 then moves to contact the body plate 322 of the second spring contact 32. Thus, electrical signal can be transmitted between the smart card and the printed circuit board 1.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical connector for use with a smart card, comprising:

a housing defining a card slot opening at a front thereof and extending toward a rear thereof, the housing forming a stop portion and a rear rim at rear end thereof; a plurality of data contacts positioned in the housing and extending into the slot for engagement with corresponding contacts of a smart card inserted into the card slot; and a spring switch being located at a rear end of the card slot and comprising a first spring contact and a second spring contact;

the first spring contact comprising a fixing portion, a body portion extending from the fixing portion, a resilient contact portion slantways extending from the body portion in a first direction and a contact arm extending from the resilient contact portion in an opposite second direction toward the fixing portion and spaced from the body portion, the first spring contact being disposed between the stop portion and the rear rim of the housing;

the second spring contact comprising a fixing portion and a body plate extending from the body plate, the second spring contact being snugly received in a recess of the stop portion of the housing;

the contact arm of the first spring contact being deflectable by a fully inserted smart card to electrically contact the second spring contact.

2. The connector as claimed in claim 1, wherein the first spring contact has a folded portion extending from the fixing portion for soldering to a printed circuit board.

3. The connector as claimed in claim 1, wherein the second spring contact has a folded portion extending from the fixing portion for securing onto the printed circuit board.

4. The connector as claimed in claim 1, wherein the stop portion and the rear rim are formed at the rear of the housing to form a space for receiving the spring switch therein.

* * * * *